US006997478B2

(12) United States Patent
Hlavaty et al.

(10) Patent No.: US 6,997,478 B2
(45) Date of Patent: Feb. 14, 2006

(54) TENSION SENSING ASSEMBLY

(75) Inventors: David G. Hlavaty, Northville, MI (US); James L. Webber, Shelby Township, MI (US); Michael T. Moury, Shelby Township, MI (US); George R. Kohut, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 189 days.

(21) Appl. No.: 10/389,077

(22) Filed: Mar. 14, 2003

(65) Prior Publication Data

US 2004/0178620 A1  Sep. 16, 2004

(51) Int. Cl.
B60R 22/00 (2006.01)
(52) U.S. Cl. .................................................. 280/801.1
(58) Field of Classification Search ................ 280/735, 280/801.1, 806
See application file for complete search history.

(56) References Cited

U.S. PATENT DOCUMENTS

| 3,618,378 A | 11/1971 | Shull et al. |
| 3,784,972 A | 1/1974 | Hults |
| 3,817,093 A | 6/1974 | Williams |
| 3,868,662 A | 2/1975 | Russell, Jr. |
| 4,424,509 A | 1/1984 | Andres et al. |
| 4,574,911 A | 3/1986 | North |
| 4,677,861 A | 7/1987 | Bartholomew |
| 4,742,886 A | 5/1988 | Sato |
| 4,805,467 A | 2/1989 | Bartholomew |
| 4,943,087 A | 7/1990 | Sasaki |
| 4,979,400 A | 12/1990 | Bartholomew |
| 5,060,977 A | 10/1991 | Saito |
| 5,087,075 A | 2/1992 | Hamaue |
| 5,181,739 A | 1/1993 | Bauer et al. |
| 5,271,129 A * | 12/1993 | Clarke et al. ................. 24/641 |
| 5,309,135 A | 5/1994 | Langford |
| 5,364,129 A | 11/1994 | Collins et al. |
| 5,454,591 A | 10/1995 | Mazur et al. |
| 5,494,311 A | 2/1996 | Blackburn et al. |
| 5,570,903 A | 11/1996 | Meister et al. |
| 5,570,932 A | 11/1996 | Collins et al. |
| 5,583,476 A | 12/1996 | Langford |

(Continued)

FOREIGN PATENT DOCUMENTS

WO    WO 99/55559    11/1999

OTHER PUBLICATIONS

"Magnetic Field Sensors for Magnetic Position Sensing in Automotive Applications", Joseph P. Heremans, General Motors Research and Development Corporation, Apr. 1, 1997.

Primary Examiner—Paul N. Dickson
Assistant Examiner—Laura B. Rosenberg
(74) Attorney, Agent, or Firm—Scott A. McBain

(57) ABSTRACT

A tension sensing assembly for a seat restraint system in a vehicle includes a rigid frame of a seat restraint buckle of the seat restraint system. The tension sensing assembly also includes a movable member operatively supported by the rigid frame and adapted to be connected to vehicle structure. The movable member is movable relative to the rigid frame. The tension sensing assembly includes a strain member operatively supported by the moveable member and the rigid frame. The tension sensing assembly further includes a strain gage sensor operatively supported by the strain member to indicate a tension level in the seat restraint system when the strain member is displaced by the movable member.

12 Claims, 3 Drawing Sheets

U.S. PATENT DOCUMENTS

| | | |
|---|---|---|
| 5,590,904 A | 1/1997 | Ellis et al. |
| 5,605,348 A | 2/1997 | Blackburn et al. |
| 5,618,056 A | 4/1997 | Schoos et al. |
| 5,636,864 A | 6/1997 | Hori |
| 5,728,953 A | 3/1998 | Beus et al. |
| 5,732,974 A | 3/1998 | Sayles |
| 5,775,618 A | 7/1998 | Krambeck |
| 5,831,172 A | 11/1998 | Kidd |
| 5,871,232 A | 2/1999 | White |
| 5,960,523 A | 10/1999 | Husby et al. |
| 5,965,827 A | 10/1999 | Stanley et al. |
| 5,996,421 A | 12/1999 | Husby |
| 6,081,759 A | 6/2000 | Husby et al. |
| 6,161,439 A | 12/2000 | Stanley |
| 6,205,868 B1 | 3/2001 | Miller |
| 6,209,915 B1 * | 4/2001 | Blakesley ................ 280/801.1 |
| 6,230,088 B1 | 5/2001 | Husby |
| 6,301,977 B1 | 10/2001 | Stojanovski |
| 6,336,371 B1 | 1/2002 | O' Boyle |
| 6,363,793 B1 | 4/2002 | O' Boyle |
| 6,382,667 B1 * | 5/2002 | Aoki ......................... 280/735 |
| 6,400,145 B1 | 6/2002 | Chamings et al. |
| 6,454,304 B1 | 9/2002 | Steffens, Jr. |
| 6,502,860 B1 | 1/2003 | Siegfried et al. |
| 6,508,114 B1 | 1/2003 | Lawson |
| 6,520,540 B1 | 2/2003 | Siegfried et al. |
| 6,554,318 B1 | 4/2003 | Kohut et al. |
| 6,679,524 B1 * | 1/2004 | Greib et al. ............. 280/801.1 |
| 6,725,727 B1 * | 4/2004 | Rogers et al. ................ 73/779 |
| 6,746,048 B1 * | 6/2004 | Tajima et al. ............ 280/801.1 |
| 6,749,038 B1 * | 6/2004 | Sullivan et al. ............. 180/268 |
| 2002/0104383 A1 | 8/2002 | Chamings et al. |
| 2003/0024326 A1 | 2/2003 | Blakesley et al. |

* cited by examiner

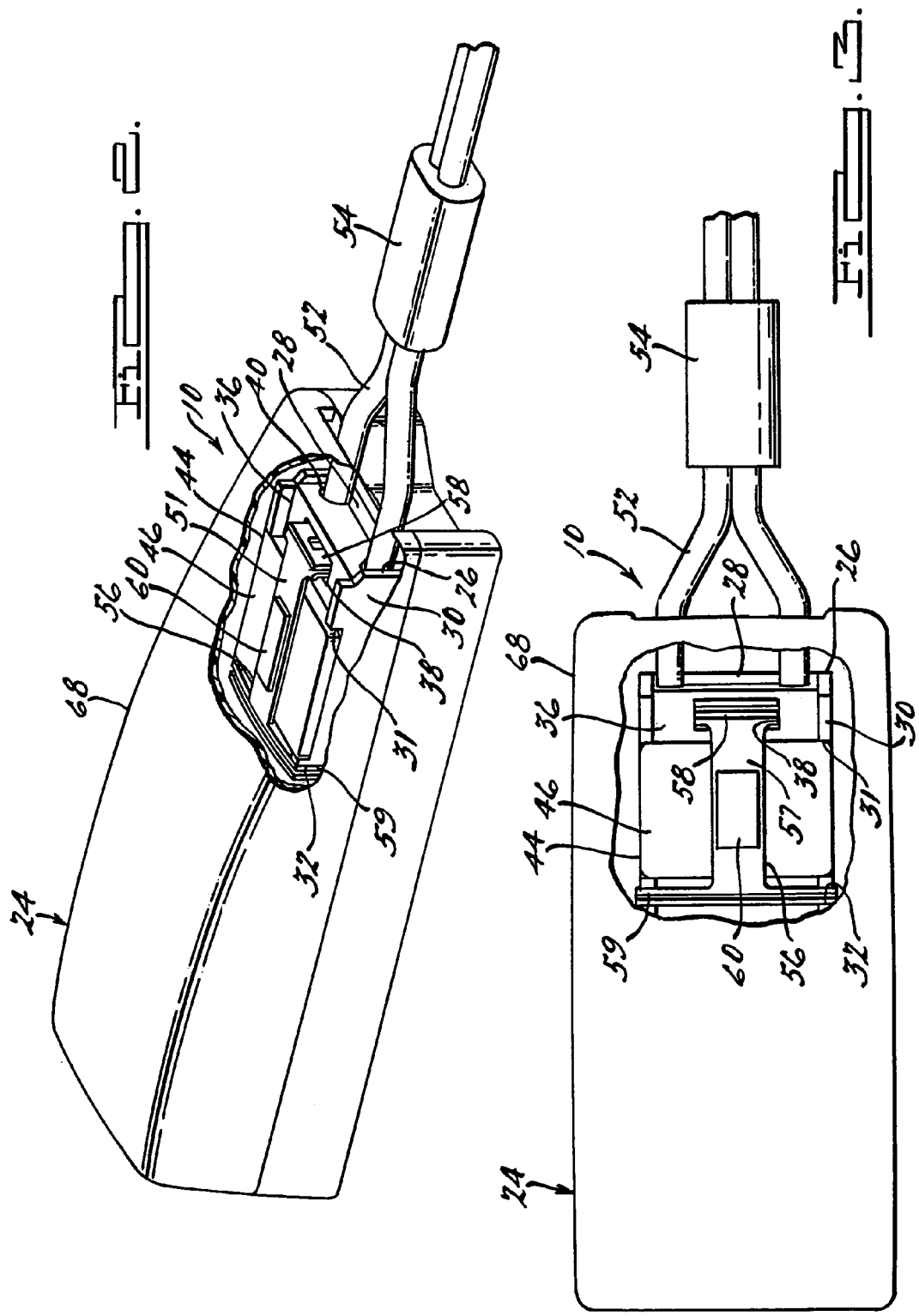

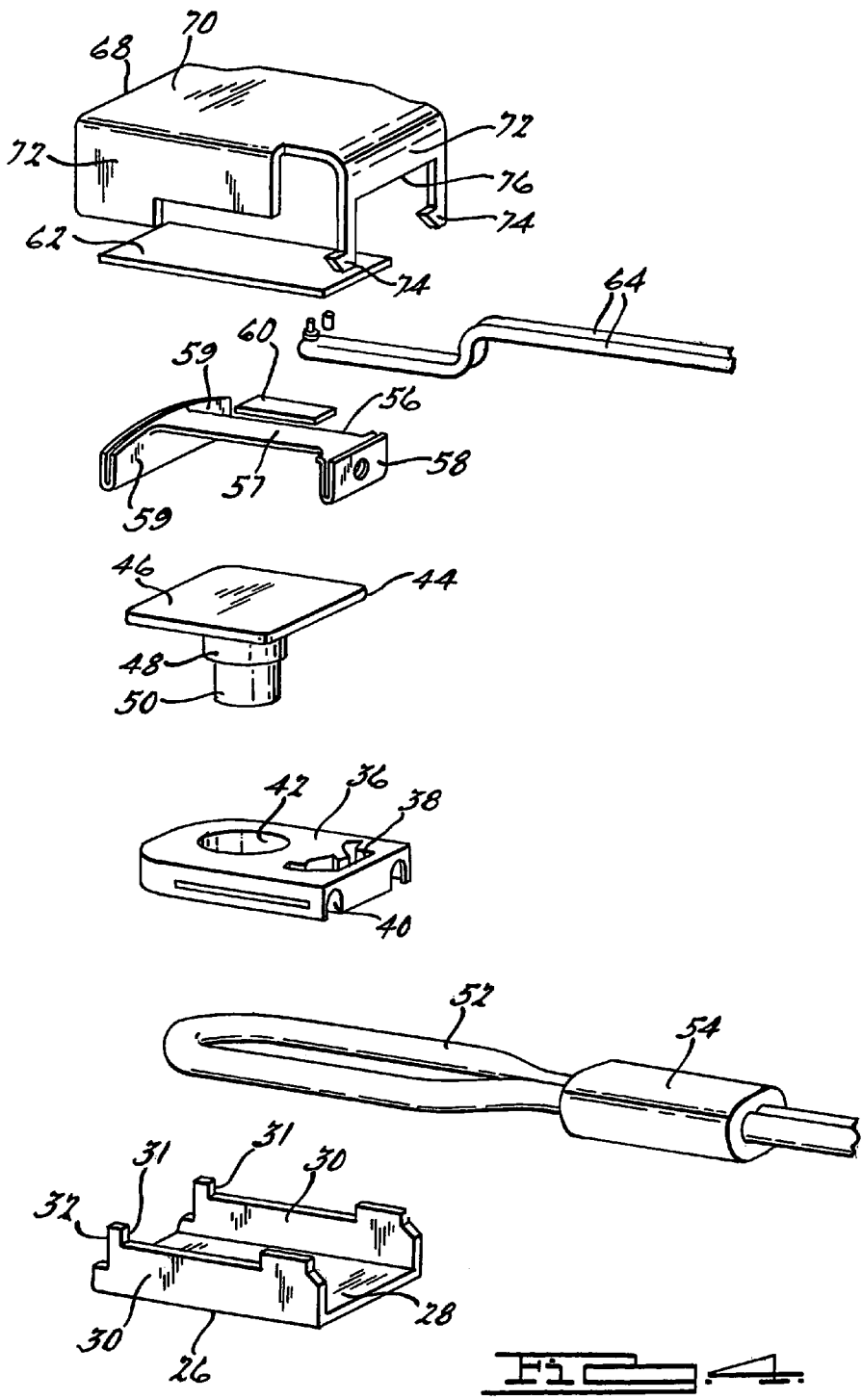

TENSION SENSING ASSEMBLY

TECHNICAL FIELD

The present invention relates generally to seat restraint systems for vehicles and, more particularly, to a tension sensing assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Smart inflatable restraint systems need to know what is occupying a seat of the vehicle. Decisions on deployment of inflatable restraints depend on information supplied by sensors in the seat in determining weight of an object in the seat. When a child seat is placed in the seat and cinched down, the sensors may read a large mass instead of a child seat. With this condition, there will be high tension in the seat restraint system. Comfort studies have shown that no human occupant would wear their seat restraint that tight. With this information on seat restraint tension, the inflatable restraint system can decide on deployment of the inflatable restraints.

Therefore, it is desirable to provide an assembly for sensing tension in a seat restraint system of a vehicle. It is also desirable to provide an assembly for sensing tension in a seat restraint system in a vehicle that allows a control module to determine the difference between either a child seat or a small occupant. It is further desirable to provide an assembly for sensing tension in a seat restraint system in a vehicle that integrates a tension sensor with a seat belt buckle to provide an indication of high-tension forces in the seat restraint system. It is still further desirable to provide an assembly for sensing tension in a seat restraint system that can be packaged with a seat belt buckle assembly. Therefore, there is a need in the art to provide a tension sensing assembly that meets these desires.

SUMMARY OF THE INVENTION

Accordingly, the present invention is a tension sensing assembly for a seat restraint system in a vehicle including a rigid frame of a seat restraint buckle of the seat restraint system. The tension sensing assembly also includes a movable member operatively supported by the rigid frame and adapted to be connected to vehicle structure. The movable member is movable relative to the rigid frame. The tension sensing assembly includes a strain member operatively supported by the moveable member and the rigid frame. The tension sensing assembly further includes a strain gage sensor operatively supported by the strain member to indicate a tension level in the seat restraint system when the strain member is displaced by the movable member.

One advantage of the present invention is that a new tension sensing assembly is provided for a seat restraint system in a vehicle. Another advantage of the present invention is that the tension sensing assembly senses tension in the seat restraint system to help in identifying what is occupying the seat, either a child, child seat, or low mass adult. Yet another advantage of the present invention is that the tension sensing assembly integrates a tension sensor with a seat restraint buckle of a seat restraint system. Still another advantage of the present invention is that the tension sensing assembly is transparent to an end user and has little or no effect on a size or shape of the seat restraint buckle. A further advantage of the present invention is that the tension sensing assembly offers significant advantages in performance and packaging size.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a fragmentary plan view of the tension sensing assembly of FIG. 1.

FIG. 4 is an exploded perspective view of the tension sensing assembly of FIG. 1.

FIG. 5 is a fragmentary elevational view of the tension sensing assembly of FIG. 1.

DESCRIPTION OF THE PREFERRED EMBODIMENT

Figure 1:
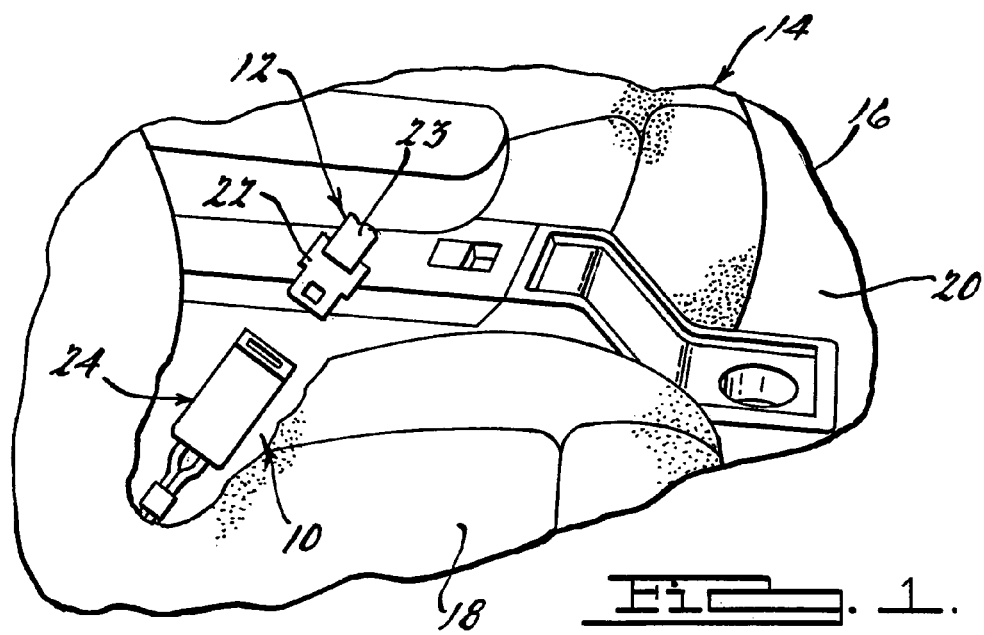
FIG. 1 is a perspective view of a tension sensing assembly, according to the present invention, illustrated in operational relationship with a seat restraint system of a vehicle.
Figure 2:
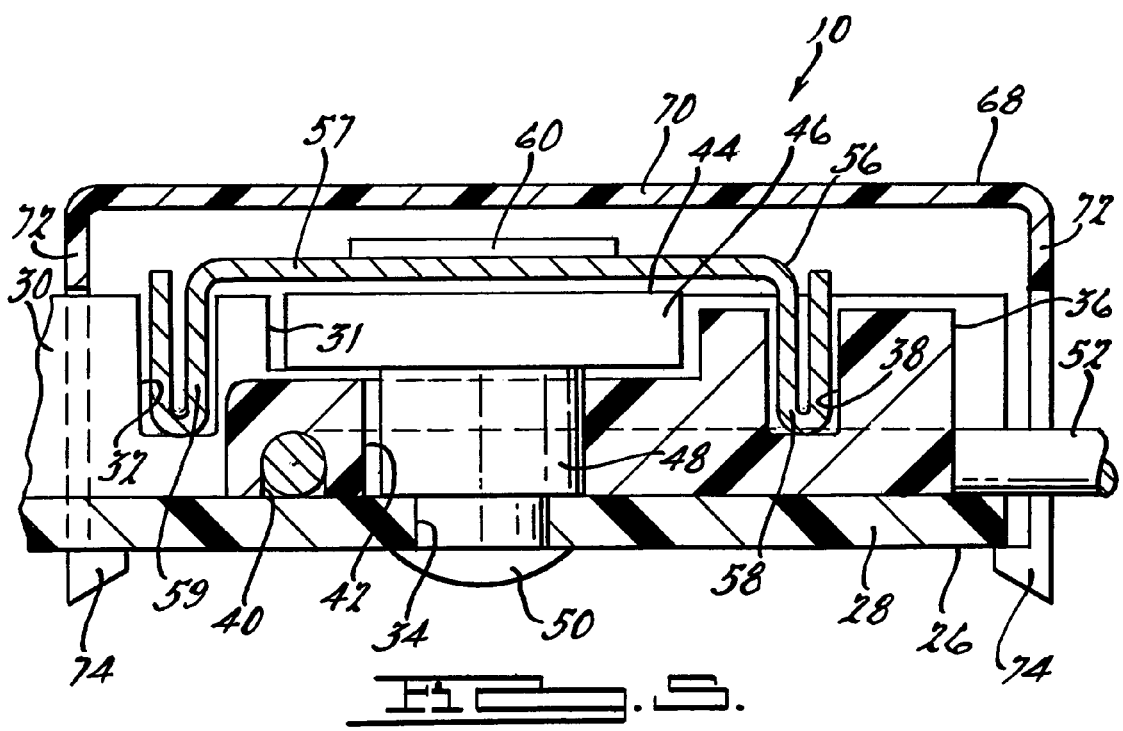
FIG. 2 is a fragmentary perspective view of the tension sensing assembly of FIG. 1.

Referring to the drawings and in particular FIG. 1, one embodiment of a tension sensing assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure such as a floorpan (not shown) in an occupant compartment 20 of the vehicle body 16. In this embodiment, the seat 18 is a front seat of the vehicle 14. It should be appreciated that the seat 18 could be a rear, second row, or third row seat for the vehicle 14.

Referring to FIG. 1, the vehicle 14 includes the seat restraint system 12 for restraining an occupant (not shown) in the seat 18. The seat restraint system 12 includes a latch tongue or plate 22 connected to belt webbing 23 at an end of either one of a lap belt, shoulder belt, or both which have another end connected to a retractor (not shown). The seat restraint system 12 also includes a buckle assembly, generally indicated at 24, for receiving the latch plate 22. The tension sensing assembly 10 is connected to the buckle assembly 24 and vehicle structure in a manner to be described. It should be appreciated that the latch plate 22 is engageable and disengageable with the buckle assembly 24. It should further be appreciated that, except for the tension sensing assembly 10, the seat restraint system 12 and vehicle 14 are conventional and known in the art.

Referring to FIGS. 1 through 5, the tension sensing assembly 10, according to the present invention, is mounted to a rigid frame 26 (partially shown) of the buckle assembly 24. The rigid frame 26 has a generally rectangular base wall 28 and side walls 30, each one of which extends longitudinally and upwardly from a respective longitudinal edge of the base wall 28. Each of the side walls 30 have a generally rectangular first recess 31 extending therein for a function to be described and a generally rectangular second recess 32 spaced longitudinally from the first recess 31 for a function to be described. The rigid frame 26 includes an aperture 34 extending generally vertically through the base wall 28 at a rear end thereof for a function to be described. The rigid frame 26 is made of a rigid material, preferably a metal material. The rigid frame 26 is a monolithic structure being integral, unitary, and one-piece. It should be appreciated that the tension sensing assembly 10 is mounted to the rear end of the buckle assembly 24. It should also be appreciated that the tension sensing assembly 10 is integral with the buckle assembly 24. It should further be appreciated that the rigid frame 26 is similar to that disclosed in U.S. Pat. No. 5,271,129 to Clarke et al.

The tension sensing assembly 10 also includes a movable member such as a slider 36 disposed between the side walls 30 of the rigid frame 26. The slider 36 is generally rectangular in shape and has a lateral width less than a lateral width of the rigid frame 26 between the side walls 30 for sliding movement therein. The slider 36 has a recess 38 extending generally vertically therein. The recess 38 is generally irregular in shape for a function to be described. The slider 36 also has a depression or channel 40 therein spaced longitudinally from the recess 38. The channel 40 has a generally inverted "U" shape for a function to be described. The slider 36 also has an elongated aperture 42 spaced from the channel 40 and recess 38 and extending generally vertically therethrough for a function to be described. The slider 36 is made of a rigid material such plastic or metal, preferably a die-cast metal, and formed as a monolithic structure being integral, unitary, and one-piece. It should be appreciated that the slider 36 interfaces the base wall 28 and side walls 30 of the rigid frame 26 for guidance.

The tension sensing assembly 10 includes a fastener 44 connected to the slider 36 and rigid frame 26. Preferably, the fastener 44 is of a rivet type. The fastener 44 has a head portion 46 extending radially and a shaft portion 48 extending axially from the head portion 46. The shaft portion 48 is generally cylindrical in shape and the head portion 46 is generally rectangular in shape. The head portion 46 has a lateral width greater than a longitudinal length. The head portion 46 extends laterally into the first recesses 31 of the side walls 30 of the rigid frame 26. The shaft portion 48 extends through the elongated aperture 42 in the slider 36 and the aperture 34 in the rigid frame 26. The fastener 44 is secured in place by a swaged end portion 50 of the shaft portion 48. The end portion 50 has a diameter greater than a diameter of the aperture 34 in the rigid frame 26 to prevent the shaft portion 48 from exiting the aperture 34 in the rigid frame 26. The fastener 44 is made of a rigid material preferably a metal material. It should be appreciated that the fastener 44 allows the slider 36 to slide a predetermined distance along the rigid frame 26 defined by the elongated aperture 42 and shaft portion 48. It should be appreciated that the fastener 44 is orbitally pinned on one end and the head 46 of the fastener 44 spans the side walls 30 of the rigid frame 26. It should also be appreciated that the fastener 44 will provide a "double hung" interface to the rigid frame 26 for strength.

The tension sensing assembly 10 further includes a connecting member such as a flexible cable 52 extending through the slider 36 and cooperating with the slider 36 for attachment to vehicle structure. The cable 52 is made of a flexible metal material such as steel. The cable 52 extends through the channel 40 in the slider 36. The free ends of the cable 52 are disposed outside of the slider 36 and are secured together by a cable clamp 54. The free ends of the cable 52 extend longitudinally and may be attached to vehicle structure or to a pretensioner (not shown). It should be appreciated that a looped portion of the cable 52 is captured in the slider 36 to create a sub-assembly of the cable 52 and slider 36. It should also be appreciated that the cable 52 may extend from a seat belt buckle pretensioner (not shown). It should further be appreciated that the cable 52 may be replaced with a belt webbing (not shown) or rigid strap (not shown) for attachment between the buckle assembly 24 and vehicle structure and is sufficient to withstand loads during a vehicle impact. Is should still further be appreciated that the cable 52, slider 36, fastener 44, and rigid frame 26 provide a structural attachment of the buckle assembly 24 to the vehicle.

The tension sensing assembly 10 includes a strain member 56 operatively supported by to the slider 36. The strain member 56 has a "necked down" or strain member portion 57 extending longitudinally. The strain member 56 has a first leg 58 at one end of the strain member portion 57 extending generally vertically and laterally and disposed in the recess 38 of the slider 36. The strain member 56 also has a plurality of, preferably two, legs 59 at the other end of the strain member portion 57 that interface the two side walls 30 of the rigid frame 26. The legs 59 of the strain member 56 extend generally vertically and laterally away from a center axis thereof and disposed in the second recesses 32 in the side walls 30 of the rigid frame 26. The legs 58,59 are shaped such that an applied load to the cable and slider sub-assembly 52,36 will transfer the load to the strain member portion 57 of the strain member 56. The strain member 56 is made of a metal material such as a high carbon steel and heat treated to provide a spring feature. The strain member 56 is formed by conventional stamping. It should be appreciated that the strain member 56 is a monolithic structure being integral, unitary, and one-piece.

The tension sensing assembly 10 also includes a strain gage sensor 60 disposed on one side of the strain member 56. The strain gage sensor 60 may be of a foil, piezo, or other stain gage type, whose output voltage changes as it is deflected or displaced. The strain gage sensor 60 is secured to the surface of the strain member 56 by suitable means such as welding. It should be appreciated that the amount of strain is proportional to the load and is predetermined based on the size, shape, thickness, and material of the strain member 56. It should also be appreciated that the legs 59 of the strain member 56 act as spring elements and the strain is concentrated in the necked down or strain member portion 57 of the strain member 56.

The tension sensing assembly 10 also includes a printed circuit board 62 electrically connected to the strain gage sensor 60 by suitable means and may be potted or encapsulated. The printed circuit board 62 is also electrically connected by electrical leads or wires 64 to a source of power such as a controller (not shown) of the vehicle. It should be appreciated that the strain gage sensor 60 is connected to the printed circuit board 62 for signal amplification and circuit protection.

The tension sensing assembly 10 may include a cover 68 disposed over the circuit board 62 and cooperating with rigid frame 26 to retain the circuit board 62 and wires 64 relative to the rigid frame 26. The cover 68 has a top wall 70 and side walls 72 extending downwardly and generally perpendicular to the top wall 70. The side walls 72 have a projection 74 extending laterally to overlap a portion of the base wall 28 of the rigid frame 26. The cover 68 has an aperture 76 extending longitudinally through the side walls 72 to allow the cover 68 to be disposed over the rigid frame 26 and allow the cable 52 to pass therethrough. The cover 68 is made of a suitable thermoplastic material. It should be appreciated that the cover 68 covers a portion of the buckle assembly 24 and is attached thereto by snap-on of the side walls 72. It should be appreciated that the cover 68 protects the slider 36 and strain gage sensor 60 from fluid contamination such as syrup type beverages.

In operation of the tension sensing assembly 10, when the latch plate 22 is not latched with the buckle assembly 24, the strain gage sensor 60 transmits a no tension signal. When the occupant buckles the seat restraint system 12, a voltage is applied to the strain gage sensor 60 by the controller and a load is applied to the strain member 56. As the load is applied to the strain member 56, the legs 58,59 allow a small amount of deflection or "strain" to the strain member 56 and a resultant output voltage is supplied, proportional to the load. The tension sensing assembly 10 sends the output voltage signal to the controller. The controller uses the output signal along with a weight signal from a bladder (not shown) in the seat 18 to decide on deployment of an inflatable restraint (not shown). It should be appreciated that the tension sensing assembly 10 provides additional input to aid in the distinction between a small child in the seat 18 or a rearward facing child seat 18 mounted in the seat. It should also be appreciated that if the seat belt tension is greater than a predetermined threshold value, then it is determined to be a child seat and not a human. It should further be appreciated that an audible tone or visual indication may be provided for the tension sensing assembly 10 when the tension in the seat restraint system 12 is increased above a predetermined level. It should still further be appreciated that the tension sensing assembly 10 could also be used in conjunction with other seat belt applications, e.g., belt tension monitoring during a vehicle impact or comfort systems.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tension sensing assembly for a seat restraint system in a vehicle comprising:
    a rigid frame of a seat restraint buckle of the seat restraint system;
    a movable member operatively supported by said rigid frame and adapted to be connected to vehicle structure, said movable member being movable relative to said rigid frame;
    a strain member operatively supported by said moveable member and said rigid frame;
    a strain gage sensor operatively supported by said strain member to indicate a tension level in the seat restraint system when said strain member is displaced by said movable member;
    said strain member having a strain member portion extending longitudinally and a first leg at one end of said strain member portion and a second leg at the other end of said strain member portion; and
    wherein said movable member has a recess extending therein to receive said first leg of said strain member and another recess receiving said second leg of said strain member.

2. A tension sensing assembly as set forth in claim 1 wherein said strain gage sensor is fixed to said strain member.

3. A tension sensing assembly as set forth in claim 1 wherein said movable member comprises a slider disposed in said rigid frame.

4. A tension sensing assembly as set forth in claim 1 further comprising
    a cable extending through said movable member and cooperable with said movable member to move said movable member to displace said strain member to change an output of said strain gage sensor to indicate a tension level in the seat restraint system.

5. A tension sensing assembly as set forth in claim 4 wherein said movable member includes a channel extending therethrough, said cable extending through said channel and cooperable with said movable member.

6. A tension sensing assembly as set forth in claim 1 wherein said movable member includes a first aperture extending therethrough and said rigid frame includes a second aperture extending therethrough.

7. A tension sensing assembly as set forth in claim 6 including a fastener extending through said first aperture in said movable member and said second aperture in said rigid frame.

8. A tension sensing assembly for a seat restraint system in a vehicle comprising:
    a rigid frame of a seat restraint buckle of the seat restraint system;
    a movable member operatively supported by said rigid frame and movable relative to said rigid frame;
    a strain member operatively supported by said moveable member and said rigid frame;
    a strain gage sensor operatively supported by said strain member;
    a cable extending through said movable member and cooperable with said movable member to move said movable member to displace said strain member to change an output of said strain gage sensor to indicate a tension level in the seat restraint system; and
    wherein said rigid frame comprises a base wall extending longitudinally and a pair of opposed side walls extending upwardly and longitudinally from said base wall, each of said side walls having a first recess extending therein.

9. A tension sensing assembly as set forth in claim 8 wherein said strain member has a strain member portion extending longitudinally and a first leg at one end of said strain member portion to be received in said first recess and a second leg at the other end of said strain member portion to be received in a second recess of said movable member.

10. A tension sensing assembly as set forth in claim 8 wherein said strain gage sensor is fixed to said strain member.

11. A tension sensing assembly as set forth in claim 8 wherein said movable member comprises a slider disposed in said rigid frame.

12. A seat restraint system as set froth in claim 11 wherein the cable extends through said slider and is cooperable with said slider to move said slider to displace said strain member to change a voltage output of said strain gage sensor to indicate a tension level in the seat restraint system.

* * * * *